UNITED STATES PATENT OFFICE.

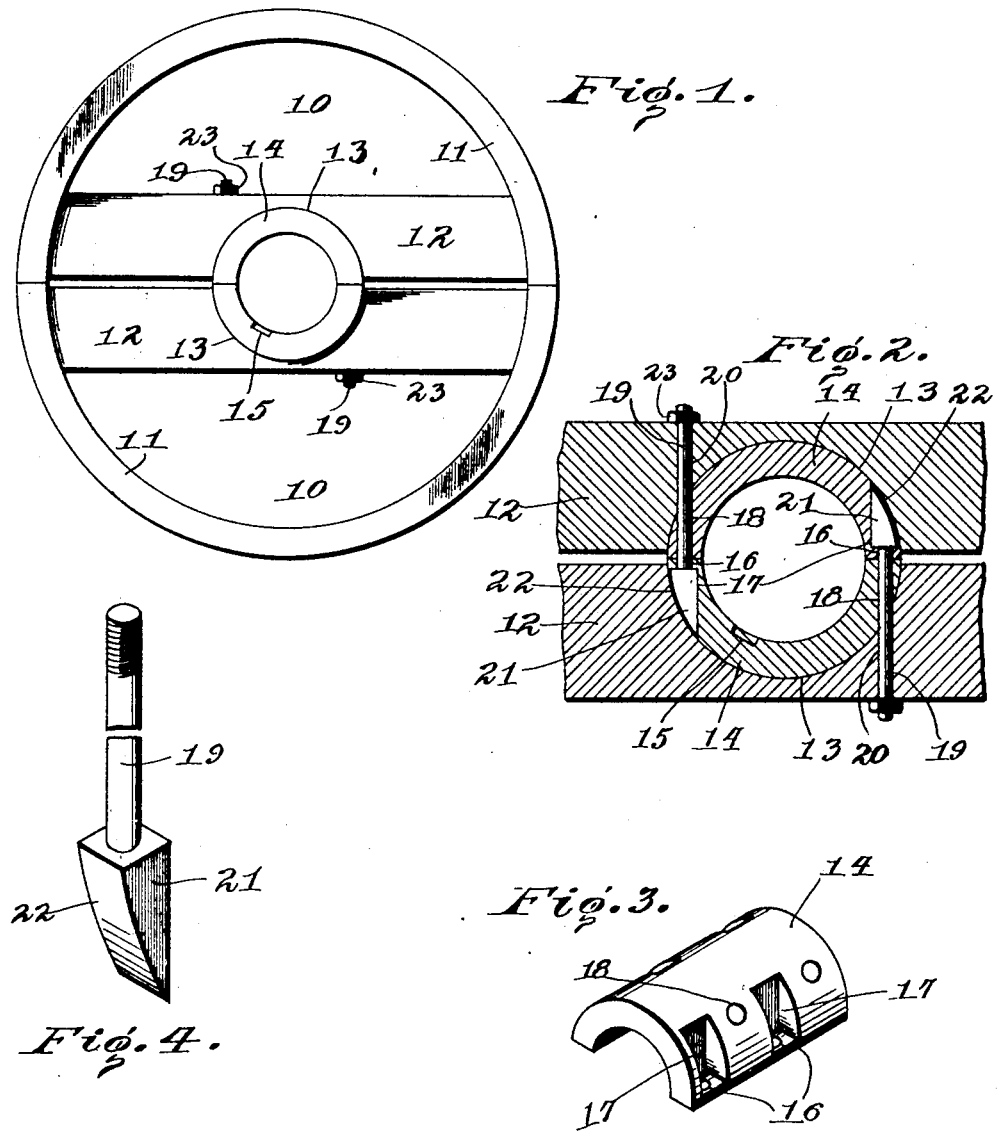

JOHN E. WALLING, OF BESSEMER, ALABAMA.

PULLEY.

1,396,608.     Specification of Letters Patent.     Patented Nov. 8, 1921.

Application filed February 24, 1920, Serial No. 360,587. Renewed April 4, 1921. Serial No. 458,388.

*To all whom it may concern:*

Be it known that I, JOHN E. WALLING, a citizen of the United States, residing at Bessemer, in the county of Jefferson and State of Alabama, have invented new and useful Improvements in Pulleys, of which the following is a specification.

This invention relates to improvements in split pulleys and aims to provide a pulley of this character which may be easily and quickly assembled in a manner to hold the parts against accidental relative movement.

Another object of the invention is the provision of a split pulley, which includes a sectional bushing, novel means being employed for securing the bushing together in a manner to securely hold the parts of the pulley associated.

Other objects and advantages of the invention will appear as the following description is read in connection with the accompanying drawings.

In the drawings:

Figure 1 is a view in elevation of a pulley embodying the present invention.

Fig. 2 is an enlarged section through the bushing and contiguous parts.

Fig. 3 is a detail perspective of one section of the bushing.

Fig. 4 is a similar view of one of the assembling bolts.

Referring in detail to the drawing, wherein like characters of reference denote corresponding parts, the pulley is made up of two sections, each of which is indicated at 10. These sections are alike in construction and include a rim section 11 and a spoke 12, the latter extending substantially diametrically of the rim and being provided in one edge with a semi-circular cut out portion 13. When the pulley is assembled these cut out portions 13 register to provide a circular opening for the reception of a bushing, which is formed of semi-circular sections 14, one of which is provided with a key slot 15 by means of which the pulleys may be keyed to a shaft.

Each of the bushing sections 14 is provided at one end with a tangentially disposed opening 16, which communicates with a relatively large squared opening 17, while the opposite end of the said section is provided with a tangentially disposed opening 18. When the sections of the pulley are assembled, the opening 16 registers with the opening 18 of the opposite bushing section 14 and passing through these registering openings is a bolt 19, the said bolt also extending through an opening 20 provided in each of the spokes 12. One end of this bolt is provided with the usual head 21, which is positioned within the opening 17 while the opposite end of this bolt is provided with a nut 23, which when adjusted in position will securely hold the parts of the pulley assembled.

The invention is susceptible of various changes in its form, proportions and minor details of construction, and the right is herein reserved to make such changes as properly fall within the scope of the appended claim.

Having described the invention what is claimed is:—

A split pulley comprising a pair of complemental sections, each including a semi-circular rim section and a spoke having a semi-circular depression therein, a semi-circular bushing section seated in said depression, said bushing section having located at one end a tangentially disposed opening, and a shoulder within said opening and also having a tangentially disposed opening at the opposite end of the bushing section and a bolt extending through the openings in each bushing section and through a registering opening in one of the spokes.

In testimony whereof I affix my signature.

JOHN E. WALLING.